United States Patent [19]
December et al.

[11] Patent Number: 5,961,802
[45] Date of Patent: Oct. 5, 1999

[54] CATHODIC ELECTROCOAT COMPOSITION HAVING LATENT FUNCTIONALITY

[75] Inventors: Timothy S. December, Rochester Hills; Paul J Harris, West Bloomfield, both of Mich.

[73] Assignee: BASF Corporation, Southfield, Mich.

[21] Appl. No.: 08/941,561

[22] Filed: Sep. 30, 1997

[51] Int. Cl.$^6$ .................................................. C25D 13/04
[52] U.S. Cl. ........................ 204/501; 204/504; 204/506; 523/404; 523/414; 523/415
[58] Field of Search .................................... 204/501, 504, 204/506; 523/404, 414, 415

[56] References Cited

U.S. PATENT DOCUMENTS

| | | | |
|---|---|---|---|
| 3,639,657 | 2/1972 | Moran et al. | 260/47 EN |
| 5,431,791 | 7/1995 | December et al. | 204/181.7 |
| 5,527,614 | 6/1996 | Carpenter et al. | 428/418 |

FOREIGN PATENT DOCUMENTS 0 440 583 A2  8/1991  European Pat. Off. .

OTHER PUBLICATIONS

Richard K. Sammel, "One–Component Eposy Provides Low VOC's, High Performance," Oct. 1985, pp. 186–192.

Marcia Agostinho & Vincent Brytus, "A High Solids One–Component, Low Temperature Bake Epoxy Coating," *J. Coatings Tech.*, Sep. 1988, at 61.

*Primary Examiner*—K. Mayekar
*Attorney, Agent, or Firm*—Mary E. Golota

[57] ABSTRACT

A cationic resin having latent primary amine functionality is described. The latent amine functionality is obtained by reacting a cyclic anhydride with an amine compound having two primary amine groups and one secondary amine group. The cationic resin is combined with a curing agent having a plurality of cyclic carbonate groups in an electrocoat bath.

26 Claims, No Drawings

CATHODIC ELECTROCOAT COMPOSITION HAVING LATENT FUNCTIONALITY

FIELD OF THE INVENTION

The present invention relates to cathodic electrodeposition coating compositions and coating methods and in particular to such coatings having latent amine functionality.

BACKGROUND OF THE INVENTION

Electrocoat, or electrodeposition coating, methods have been used commercially for applying decorative and protective coatings to metallic substrates for a number of years. In the electrodeposition coating process, a conductive article or substrate that is to be coated is used as one electrode in an electrochemical cell. The article is submerged in an aqueous dispersion of the coating composition, which contains a charged, preferably a cationic, resin. The resin is deposited onto the article by applying an electrical potential between the article and a second electrode (which may be, for example, the walls of the vessel holding the bath). The coating deposits onto the article until it forms an insulating layer on the article that essentially prevents more current from being passed. The electrocoating process is particularly suited to applying a continuous and uniform protective primer layer to an article or workpiece that has complex shape or construction. When the surfaces of the article closest to the other electrode have been coated and insulated, the current then deposits the coating onto recessed areas and other less accessible areas until an insulating coating layer is formed on all conductive surfaces of the article or workpiece, regardless of how irregularly shaped the article.

Electrocoat processes, particularly for coating automotive bodies and parts, usually employ a thermosetting coating composition comprising an ionic, preferably a cationic, principal resin and a polyfunctional oligomeric or monomeric crosslinking agent that is capable of reacting with the principal resin to cure or crosslink the coating. The crosslinking agent is associated with the principal resin in the dispersion and is deposited along with the principal resin onto the article or workpiece. After deposition, the deposited coating may be cured to a crosslinked, durable coating layer.

A number of crosslinking mechanisms may be employed. One curing mechanism utilizes a melamine formaldehyde resin curing agent in the electrodepositable coating composition to react with hydroxyl groups on the electrodeposited resin. This curing method provides good cure at relatively low temperatures (e.g., 132° C.), but the crosslink bonds contain undesirable ether linkages and the resulting coatings provide poor overall corrosion resistance as well as poor chip and cyclic corrosion resistance. In an alternative curing method, polyisocyanate crosslinkers may be reacted with hydroxyl groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime or alcohol). Blocked polyisocyanates, however, require high temperatures (e.g., 150° C. or more) to unblock and begin the curing reaction. The resulting electrocoats can also be susceptible to yellowing. Moreover, the release of the volatile blocking agents during cure increases emissions and decreases the amount the solid material in the coating composition that ultimately becomes part of the cured film formed on the substrate.

There is thus a need in the art for electrodepositable coating compositions that could provide desirable urethane crosslink linkages, but avoid the problems that accompany the use of blocked polyisocyanate curing agents.

U.S. Pat. No. 5,431,791 describes a cathodic electrodeposition method that applies a coating layer of a resin having a plurality of acid-salted primary amine groups and a curing agent having a plurality of cyclic carbonate groups. In this method, high levels of the salted primary amine were needed in order to achieve desirable levels of crosslinking. The high content of salted primary amine, however, can cause excessive bath conductivity.

SUMMARY OF THE INVENTION

We have now invented an electrodeposition coating composition capable of forming durable urethane linkages upon curing of the electrocoat coating without the problems associated with the use of blocked polyisocyanate curing agents or the high bath conductivities of the '791 patent resulting from high concentrations of primary amine groups.

The compositions of the present invention comprise, in an aqueous medium, a cationic resin having latent primary amine functionality and a curing agent having a plurality of cyclic carbonate groups. The latent amine functionality of the compositions of the invention is available for crosslinking when the deposited coating is cured but does not increase bath conductivity or cause coating deposition problems as would free amine groups. The cationic resin may additionally have salted primary amine groups that, after deposition, provide primary amine groups as additional crosslinking sites.

The present invention further provides a method of coating a conductive substrate. In the method of the invention, a conductive substrate is immersed in an electrodeposition coating composition comprising, in an aqueous medium, a cationic resin having latent primary amine functionality and a curing agent having a plurality of cyclic carbonate groups; then, a potential of electric current is applied between an anode and the conductive substrate (which is then the cathode) to deposit a coating layer onto the conductive substrate. The present invention also provides a conductive substrate having thereon a coating derived from a composition containing a resin having latent primary amine functionality and a curing agent having a plurality of cyclic carbonate groups.

DETAILED DESCRIPTION

The compositions of the invention are aqueous and include a cationic principal resin having latent primary amine functionality and a curing agent with a plurality of cyclic carbonate groups. The principal resin having latent amine functionality may be formed by a two-step synthesis. In the first step, two moles of a cyclic anhydride of a polycarboxylic acid are reacted with two moles of a compound having at least two primary amine groups and at least one group reactive with a functional group on the principal resin. In a second step, the product of the first step is reacted with a resin to form the principal resin with latent primary amine functionality.

In the first step of the synthesis of the principal resin with latent primary amine functionality, an amine compound with at least two primary amine groups and at least one different reactive group is employed. Preferably, the amine compound has up to three, more preferably one or two, and particularly preferably one group that is reactive with an epoxide group. Preferably, the amine compound has one secondary amine group. Suitable examples of the primary amine compounds include, without limitation, polyalkylene polyamines.

Examples of suitable polyalkylene polyamines include, without limitation, diethylenetriamine, triethylenetetramine, tetraethylenepentamine, dipropylenetriamine, and mixtures of these. Particularly preferred among these are diethylenetriamine, dipropylenetriamine, and mixtures of these compounds. Preferred polyamines have molecular weights in the range of about 75 to about 400, more preferably from about 75 to about 250, and still more preferably from about 100 to about 160.

Suitable examples of cyclic anhydrides of polycarboxylic acids that may be used in the reaction with the primary amine compound include, without limitation, phthalic anhydride and substituted derivatives of phthalic anhydride such as 4-sulfophthalic anhydride, 4-methylphthalic anhydride, 3-hydroxyphthalic anhydride, nitrophthalic anhydride, and 4,4'-carbonyldiphthalic anhydride; hydrogenated derivatives of phthalic acid such as hexahydrophthalic anhydride, 1,2,3,6-tetrahydrophthalic anhydride, 3,4,5,6-tetrahydrophthalic anhydride, hexahydro-4-methylphthalic anhydride, and methyltetrahydrophthalic anhydride; maleic anhydride and its derivatives, such as 2,3-dimethylmaleic anhydride, 2,3-diphenylmaleic anhydride, bromomaleic anhydride, and dichloromaleic anhydride; pyromellitic dianhydride; succinic anhydride and its derivatives, such as dodecenylsuccinic anhydride, and methylsuccinic anhydride; 1,2-cyclohexane dicarboxylic acid, nadic methyl anhydride (methyl-5-norborene-2,3-dicarboxylic anhydride), cis-5-norborene-endo-2,3-dicarboxylic anhydride, itaconic anhydride, 2,3-pyridinedicarboxylic anhydride, pyromellitic dianhydride, endo-bicyclo[2.2.2]oct-5-ene-2,3-dicarboxylic anhydride, 1,2,3,4,-cyclobutanetetracarboxylic dianhydride, and 1-cyclopentene-1,2-dicarboxylic anhydride. Preferred among these are phthalic anhydride and substituted derivatives of phthalic anhydride and hydrogenated derivatives of phthalic acid.

The reaction between the cyclic anhydride and the amine compound is preferably carried out with purified reactants and with an excess of the primary amine compound in order to minimize the polydispersity of the product. Thus, while a ratio of about one mole of the primary amine compound to about one mole of the anhydride is stoichiometric to obtain the desired latent amine compound, it is preferred to employ a ratio of at least about two moles, and preferably at least about three moles, of the primary amine compound per mole of the anhydride. In a particularly preferred embodiment, a ratio of about four moles of distilled diethylenetriamine to about one mole of reagent-grade phthalic anhydride is reacted to form the latent primary amine compound. The excess amine compound is removed, for example by vacuum distillation, following completion of the reaction. For reasons that the person of skill in the art will appreciate, the ratio of moles of primary amine compound to anhydride should not be too high, and it is preferred that the ratio not exceed about eight moles, and preferably about six moles, of primary amine compound per mole of the anhydride. The product of the excess amine compound procedure is found to have a low concentration of, or to be free of, residual carboxylic acid groups. This is thought to indicate that the cyclic tetramide is preferentially formed over a linear product.

The reaction product of the amine compound and the cyclic anhydride preferably has a polydispersity of about 3 or less, more preferably of about 2 or less, and even more preferably about 1.1 or less. Reaction products that have a polydispersity of about 1.05 or less are particularly preferred.

In the second step of the synthesis of the principal resin having latent amine functionality, the latent primary amine reaction product of the cyclic anhydride and the primary amine compound is reacted with a resin having at least one group reactive with the functionality of the latent primary amine reaction product to form the principal resin with latent primary amine functionality. The resin used to form the principal resin can be any of a number of resins, including, without limitation, epoxy, acrylic, polyester, polyurethane, polyamide, and polybutadiene resins.

In a preferred embodiment, the resin has at least one epoxide group and is an epoxy resin, particularly a polyglycidyl ether. The preferred polyglycidyl ethers are polyglycidyl ethers of bisphenol A, bisphenol F, and similar polyphenols. Epoxy resins can be prepared, for example by etherifying a polyphenol using an epihalohydrin, such as epichlorohydrin, in the presence of alkali. In a preferred embodiment, the epoxy resins are extended with polyphenol, such as bisphenol A, or with polyamine. The polyepoxide compound can be modified or extended, for example by reaction of the glycidyl groups with a polyphenol such as bisphenol A or with a polyamine such as those sold by BASF AG of Germany under the tradename POLYAMIN and under the tradename Jeffamine® by Huntsman Co. of Houston, Tex. Preferred epoxy resins have a weight average molecular weight, which can be determined by GPC, of 3000 to 6000. Epoxy equivalent weights can range from 500 to 1900, and preferably from 800 to 1200.

Novolac epoxies are also suitable as an epoxide-functional resin that is reacted with the latent primary amine compound to produce the principal resin of the invention. The novolac epoxy resin may be epoxy phenol novolac resins or epoxy cresol novolac resins having the formula II:

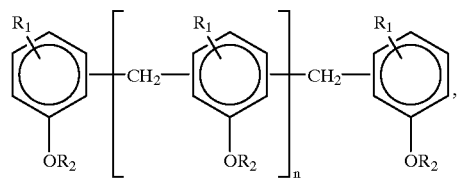

(II)

in which $R_1$ is H or methyl, $R_2$ may be H or a glycidyl group, with the proviso that on average at least two $R_2$ groups per molecule are glycidyl groups, and n is from 0 to 12, preferably from 3 to 8, and more preferably 3 or 4. The novolac resin may also be an aromatic novolac bisphenol A resin, having either the formula III

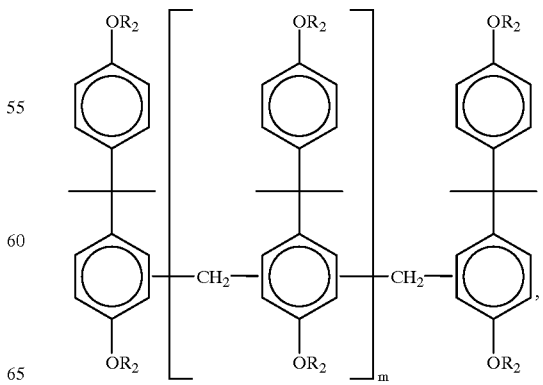

(III)

or the formula IV

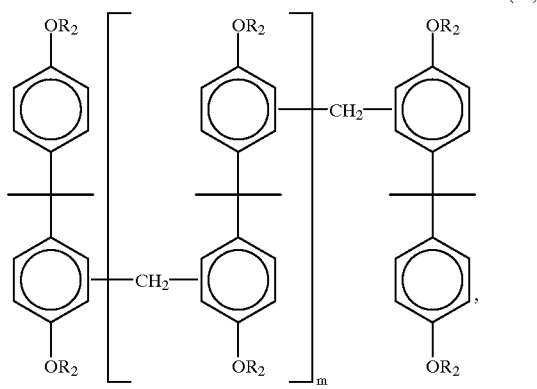

wherein, for each formula, $R_2$ may be H or a glycidyl group, with the proviso that on average at least two $R_2$ groups per molecule are glycidyl groups, and m is from 0 to 4, preferably from 0 to 2.

Acrylic polymers having at least one group reactive with the latent amine compound can be prepared from epoxide-functional monomers, such as glycidyl methacrylate, or isocyanate-functional monomers, such as isocyanatoethyl methacrylate, isopropenyl isocyanate, or meta-isopropenyl-α,α-dimethylbenzyl isocyanate. The monomers that have functional groups reactive with the latent amine compound are copolymerized with other monomers, such as esters and other derivatives of acrylic acid and methacrylic acid, for example methyl methacrylate, butyl methacrylate, cyclohexyl methacrylate, hydroxyethyl acrylate, hydroxybutyl acrylate, 2-ethylhexyl acrylate, n-butyl acrylate, and/or other monomers that are known to be copolymerizable with these such as vinyl esters, aromatic monomers such as styrene, and so on. The latent primary amine compound is reacted with the glycidyl or isocyanate groups of the acrylic resin. Other amine functionality can be incorporated in the acrylic polymers by copolymerization of a tertiary amine-containing acrylic monomer or by reaction of a polyamine with one or more of the isocyanate or epoxide groups.

Polyesters can also be used as the resin in the composition according to the invention. Polyesters may be prepared by the reaction of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol). Epoxide groups can be incorporated into polyesters by reacting a carboxylic acid-functional polyester with a molar excess of a polyepoxide compound. Isocyanate groups can be incorporated into polyesters by reacting a hydroxyl-functional polyester with a molar excess of a polyisocyanate (preferably a diisocyanate) compound. The epoxide or isocyanate groups can then be reacted with the latent amine reaction product to introduce the latent primary amine functionality.

Epoxy-modified polybutadiene, polyisoprene, amine-terminated butyl nitrile rubber, butadiene-acrylonitrile rubber, or other epoxy-modified rubber-based polymers can be used as the resin in the present invention.

At least one functional group, e.g., epoxide or isocyanate group, on the resin is reacted with a secondary amine of the product of the cyclic anhydride-amine compound reaction product in order to introduce the latent amine functionality. The reaction may be carried out at temperatures of, for example, about 65–75° C. The reaction temperature is preferably below the temperature at which the latent amine compound would be expected to decompose to regenerate primary amine functionality. If desired, other amine groups can be incorporated by reacting one or more reactive groups of the resin with a polyamine containing secondary and/or primary amines. In a preferred embodiment, one or more epoxide groups on an epoxy resin are reacted with the latent amine compound and with a compound comprising a secondary amine group and at least one primary amine group blocked by a ketimine. The ketimine will hydrolyze upon dispersion to regenerate a primary amine that can be salted to provide dispersion stability and can be crosslinked by the carbonate curing agent.

Polyurethanes can also be used as the resin in the present invention. Polyurethanes are prepared by the reaction of a polyisocyanate and a polyol. Examples of useful polyisocyanates include hexamethylene diisocyanate, toluene diisocyanate, methylenediphenyldiisocyanate (MDI), isophorone diisocyanate, and biurets and isocyanurates of these diisocyanates. Examples of useful polyols include low molecular weight aliphatic polyols, polyester polyols, polyether polyols, fatty alcohols, and the like. In the case of a polyurethane resin, the polyurethane can be synthesized with terminal isocyanate groups that can then be reacted with the secondary amine groups of the latent amine compound. Again, if desired, primary amine functionality can be included by reaction of an isocyanate group of the polyurethane with a compound comprising a secondary amine group and at least one latent primary amine group blocked by a ketimine.

The amount of primary amine vs. the amount of latent primary amine provided by the anhydride/amine compound reaction product can be balanced to provide a sufficient concentration of crosslinkable groups for good cure without excessively high bath conductivities. Resins used according to the invention preferably have an equivalent weight of functional groups available for crosslinking, which include primary amine groups and latent primary amine groups, of at least about 300 eq/g and preferably up to about 500 eq/g. Resins used according to the invention also preferably have an equivalent weight of groups available for salting, which include primary amine groups, of at least about 1300 eq/g and preferably up to about 1500 eq/g.

The principal resin of the invention has latent amine functionality that may be represented by the structure (I):

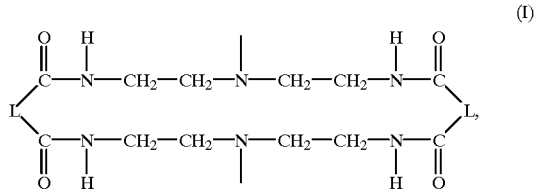

in which at least one of the amine nitrogens is covalently bonded to the principal resin and the other nitrogen is preferably a secondary amine (i.e., bonded to a hydrogen atom). The L is a bivalent linking group in which the bonding valences, connecting to the carbon of the amide carbonyls, are on two adjacent carbon atoms. The adjacent, bonding carbon atoms may be bonded to one another with a single bond (as for the product prepared using hexahydrophthalic anhydride), a double bond (as for the product prepared using maleic anhydride), or an aromatic bond (as for the product prepared using phthalic anhydride). Either or both of the adjacent bonding carbon atoms may carry a substituent or the adjacent bonding carbon atoms may be members of an aliphatic or aromatic ring, wherein the ring may itself be substituted at any available carbon atom. Thus, L may have the various structures

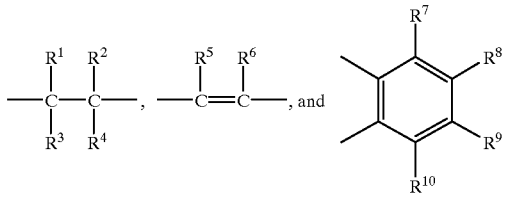

wherein $R^1$ through $R^{10}$ may independently be selected from hydrogen; halides; alkyl, cycloalkyl, or aryl groups, including derivatives of these such as halogenated and sulfonated derivatives; or two R groups may together form a cyclic structure.

It may be advantageous to include other functional groups such as hydroxyl groups on any of the above-described resins. These functional groups may serve as reaction sites for optional auxiliary crosslinkers such as aminoplast resins. Minor amounts of blocked isocyanate crosslinking agents may be included, for example up to about 10%, preferably up to about 5% by weight based on combined weight of crosslinking agents and principal resin. Techniques for incorporation of such groups is well-known in the art.

Amine groups of the resin are at least partially salted, and may be fully salted, with an acid, such as acetic acid, lactic acid, or citric acid, to make a cationic resin on dispersion in an aqueous medium. The resin must carry a cationic charge to enable the resin to be electrodeposited onto the cathode of an electrodeposition cell.

The compositions of the invention further include at least one crosslinking agent having on average two or more carbonate groups per molecule. The crosslinking agent may comprise cyclic carbonate groups having various ring sizes as are known in the art, such as five-member cyclic carbonate rings, six-member cyclic carbonate rings, seven-member cyclic carbonate rings, or fused ring systems containing the characteristic —O—CO—O— carbonate moiety.

Cyclic carbonate compounds may be synthesized by any of several different approaches. One approach involves reacting an epoxy group-containing compound with $CO_2$, preferably under pressure with a catalyst. Useful catalysts include any that activate an oxirane ring, such as tertiary amine quaternary salts (e.g., tetramethyl ammonium bromide), tin and/or phosphorous complex salts (e.g., $(CH_3)_3SnI$, $(CH_3)_4PI$). Epoxides can also be reacted with β-butyrolactone in the presence of such catalysts. In another approach, a glycol, such as glycerin, may be reacted at temperatures of at least about 80° C. (usually under reflux) with diethyl carbonate in the presence of a catalyst (e.g., potassium carbonate) to form a cyclic carbonate. Alternatively, a functional compound containing a ketal of a 1,2-diol having the structure:

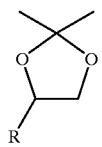

can be ring-opened with water at temperatures of at least 60° C., preferably with a trace amount of acid, to form a 1,2-glycol. As an alternative to reaction with diethyl carbonate, glycols can be reacted with phosgene in the presence of sodium hydroxide to form a cyclic carbonate. Five-member cyclic carbonate rings can be formed from 1,2-glycols. Six-member cyclic carbonate rings can be formed from 1,3-glycols. Fused rings may be formed, for example, by the reaction of phenol with phosgene to form phenylene carbonate. Cyclic carbonates typically have 5-6- member rings. Five-member rings are preferred, due to their ease of synthesis and to a greater degree of commercial availability.

In a preferred embodiment, compounds useful as the carbonate crosslinking agent are prepared by reaction of a polyepoxide with carbon dioxide to convert the epoxy groups to cyclic carbonate groups. Polyepoxides useful for preparing the carbonate crosslinking agents include, for example, any of the epoxide-functional resins described above. Monomeric or oligomeric polyepoxide materials are preferred. Among preferred compounds for synthesis of the curing agents of the invention are glycidyl ethers of polyols and glycidyl esters of polyacids. The polyepoxides can be reacted with carbon dioxide, as described above, to form the cyclic carbonate crosslinker.

Cyclic carbonates with average functionality greater than about three are also contemplated and, in many cases, are preferred. Compounds having higher carbonate functionality may be obtained, for example, by reacting one mole of a diisocyanate such as isophorone diisocyanate with two moles of a polyol such as trimethylol propane to produce a tetrafunctional alcohol, which can be epoxidized with an epihalohydrin to produce a tetrafunctional polyepoxide. The tetrafunctional polyepoxide can in turn be reacted with carbon dioxide to form a tetrafunctional cyclic carbonate. Other higher-functionality polyepoxides, e.g., tetrakis(4-glycidyloxy-phenyl)ethane or the epoxide-functional novolac epoxies, may also be reacted with $CO_2$ to form poly-cyclic carbonates. Even substantially higher functionalities can be used, such as polymeric polyepoxides (e.g., epoxide-functional acrylic resins) converted to polymeric cyclic carbonate compounds, for which the functionality will be a function of the equivalent weight of the polymer.

One preferred class of cyclic carbonate compounds useful as the crosslinking agent of the invention are compounds having an average of at least about four cyclic carbonate groups per molecule. In another preferred embodiment, each cyclic carbonate group is appended to an ether segment, for example a segment having at least one unit of propylene oxide. Such cyclic carbonate compounds may be prepared by reacting a polyether polyol with an epihalohydrin to convert the hydroxyl groups to epoxy groups. The polyether polyols may be based upon simple polyols having three or four hydroxyl groups, or mixtures of such compounds. Illustrative examples include, without limitation, trimethylolpropane, pentaerythritol, 1,2,6-trihydroxyhexane, xylose, adonitol, and so on. The epoxy groups may then be converted to cyclic carbonate groups by reaction with $CO_2$. Examples of useful polyether polyols include polypropylene glycols based on pentaerythritol and having up to 7 total polyether units.

One route for the preparation of cyclic ring carbonates can be represented by the formula:

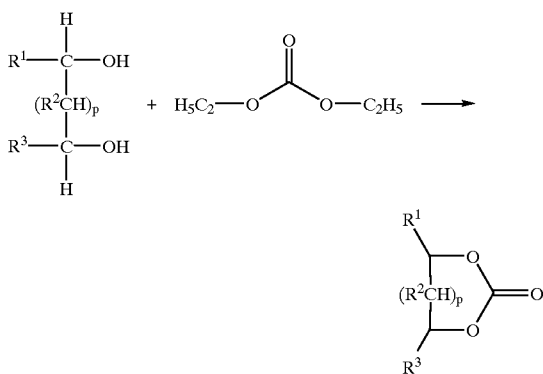

where p is 0 or a positive integer (preferably 0, 1, or 2) and $R^1$, $R^2$, and $R^3$ are each independently H or an organic radical with the proviso that at least one of $R^1$, $R^2$, and $R^3$ is an organic radical to which other cyclic carbonate groups can be attached or a group capable of bonding to an organic radical to which other cyclic carbonate groups can be attached.

In one preferred embodiment of the invention, the crosslinking agents are represented by the formula:

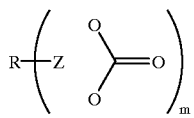

where R represents a polyvalent organic radical, and preferably a trivalent or tetravalent organic radical; Z represents the carbon atoms necessary to complete a substituted or unsubstituted five-, six-, or seven-member cyclic carbonate ring; and m represents an integer of at least 2.

In another preferred embodiment of the invention, the crosslinking agents are represented by the formula:

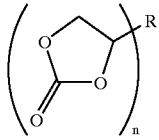

where R represents a polyvalent organic radical, and preferably a trivalent or tetravalent organic radical; and n is at least about two, more preferably at least about 3, and n is preferably up to about eight, more preferably up to about 6, and even more preferably up to about 4.

The electrodepositable coating compositions used in the practice of the present invention are dispersed in aqueous medium. The term "dispersion" as used within the context of the present invention refers to a two-phase translucent or opaque aqueous resinous system in which the resin is believed to be the dispersed or emulsified phase and water the continuous phase, although a minor portion of the resin may even be dissolved in the continuous phase. The average particle size diameter of the resinous phase is usually at least about 0.1 micron; the average particle size diameter may be up to about 10 microns, but preferably it is less than about 5 microns. The concentration of the resinous products by weight in the aqueous medium is, in general, not critical, but ordinarily the major portion of the aqueous dispersion is water. The aqueous dispersion usually contains at least about 3 percent, preferably at least about 10 percent, by weight resin solids; and the dispersion may contain up to about 50 percent, preferably up to about 35 percent, by weight resin solids. Aqueous resin concentrates that are to be further diluted with water generally may be at least about 10% by total weight solids and may be up to about 30 percent by total weight solids. In general, sufficient water is added so that the dispersion has a solids content of more than about 20% by weight, preferably more than about 30% by weight.

The above components are uniformly dispersed in an aqueous medium. Usually, the principal resin and the crosslinking agent are blended together before the resins are dispersed in the water. The salting acid may be blended with the resins, mixed with the water, or both, before the resins are added to the water. The acid is used in an amount sufficient to neutralize enough of the amine groups of the principal resin to impart water-dispersibility to the resin. The resin should be neutralized to a degree sufficient to prevent premature reaction of any primary amine groups with the cyclic carbonate groups on the crosslinking agent from adversely affecting the properties of the coating bath (typically at least 80%, and more preferably 90–100%). Examples of useful acids include phosphoric acid, acetic acid, propionic acid, citric acid, and lactic acid.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol, monoalkyl ethers of ethylene glycol such as the monomethyl, monoethyl, monopropyl, and monobutyl ethers of ethylene glycol; dialkyl ethers of ethylene glycol such as ethylene glycol dimethyl ether; or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

The electrodeposition coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigments may be dispersed using a grind resin or, preferably, a pigment dispersant such as is disclosed by Carpenter et al. in U.S. Pat. Nos. 5,527,614 and 5,536,776, incorporated herein by reference. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow.

The electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight based on resin solids. Plasticizers may be included, for example to promote flow and coalescing of the film. Preferred plasticizers include the products of polyethers, such as poly(ethylene oxide) or poly(propylene oxide), with phenolic compounds such as nonyl phenols, p-cresol, or bisphenol A. Plasticizers are usually included at levels of about 0 to 15 percent by weight resin solids.

The electrodeposition coating composition should have an electroconductivity of at least about 1200 micromhos. While higher conductivities are possible, the conductivity should preferably be 3000 micromhos or less, more preferably about 2000 micromhos or less. When conductivity is too low, it is difficult to obtain a film thickness having desired protective and other functions. Conversely, if the composition is too conductive, problems such as the dissolution of the coated film or film rupture during deposition may arise.

Electrodeposition of the coating preparations according to the invention may be carried out by any of a number of processes known to those skilled in the art. The deposition may be carried out on all electrically conducting substrates, for example metal, such as steel, copper, aluminum and the like.

The electrodeposition coating composition used in this invention may be applied on a conductive substrate to a dry film thickness of 15 to 35 microns. After application, the coating may be cured at a temperature sufficiently high to generate primary amine groups from the latent primary amine groups. Usually, the coating will be cured at a temperature of at least about 80° C., preferably at least about 100° C., and particularly preferably at least about 120° C. The curing time will vary depending on the particular components used, and physical parameters such as the thickness of the layers, however, typical curing times range from 15 to 60 minutes.

Unlike curing of systems with blocked isocyanate crosslinkers or with alkylated melamine resins, the curing chemistry of the present invention does not involve release of a volatile organic by-product. Thus, the inventive compositions offer the significant advantages of producing lower emissions and of providing a higher conversion of bath solids into cured coating.

According to the invention, a pigmented resin coating and optionally a clearcoat layer may be applied over the electrocoat primer layer. The electrocoat primer layer may optionally be coated first with a second primer layer by spray application. In automotive applications, the pigmented resin layer is often called a basecoat or color coat when a clearcoat layer is to be applied on top of it, or a topcoat when the pigmented resin coating is to be the outer layer. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of crosslinkable functional groups. Such groups include, for example, hydroxy, isocyanate, amine, epoxy, acid, anhydride, acrylate, vinyl, silane, and acetoacetate groups. These groups may be masked or blocked in such a way so that they are unblocked and available for the cross-linking reaction under the desired curing conditions, generally elevated temperatures. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be selected from aminoplast resins, isocyanates and blocked isocyanates (including isocyanurates), and acid or anhydride functional crosslinking agents. Preferably, a clearcoat containing a vehicle having carbamate functionality, as for example a clearcoat according to U.S. Pat. No. 5,474,811, is applied wet-on-wet over a layer of a basecoat composition. The coatings applied over the electrocoat coating layer of the invention are applied and, preferably, crosslinked according to methods well-known in the art.

The invention is further described in the following example. The example is merely illustrative and does not in any way limit the scope of the invention as described and claimed. All parts are parts by weight unless otherwise noted.

Synthesis 1: Preparation of Latent Amine Compound

A 1-liter glass flask was charged with 340 grams of fresh diethylenetriamine. The diethylenetriamine was heated to about 90° C. under a nitrogen blanket. A total of 122.3 grams of phthalic anhydride (ACS grade, >99.5%) was added over a period of about 20 minutes. The reaction mixture was held at 100° C. for two hours. The reaction mixture was then vacuum stripped. The residue (165.5 grams) was ground, washed with three 350-ml portions of THF, then dried in the oven. The product (about 150 grams) had a number average molecular weight of 143 and a weigh average molecular weight of 154, as measured by GPC. The amine equivalent weight was determined by titration to be 164 eq./gram.

Synthesis 2: Preparation of Carbonate Crosslinker

A 5-liter stainless steel pressure reactor was charged with 398.0 grams of a tetraglycidyl ether (reaction product of pentaerythritol, propylene oxide, and epichlorohydrin having a weight per epoxide of 169.5). A total of 2.5 grams of tetrabutylammonium bromide were added. The contents of the reactor were heated to 100° C. After a short purge of the reactor with a steady stream of carbon dioxide gas, the system was sealed and carbon dioxide gas was introduced to a pressure of 8 atm. The reaction mixture was held under these conditions for 14 hours, at which time analysis by infrared spectroscopy indicated that the reaction was complete. The resin product was 99.8% nonvolatile and had a viscosity of 6800 centipoise.

Synthesis 3: Preparation of Electrocoat Emulsion

A 1-liter glass flask was charged with a mixture of 256.5 grams of the diglycidyl ether of bisphenol A, 58.6 grams of bisphenol A, 56.1 grams of dodecylphenol, and 20.3 grams of xylene. The mixture was heated to 125° C., and then 0.9 gram of dimethylbenzylamine was added. An exothermic reaction raised the temperature of the reaction mixture to 168° C. The mixture was then cooled, and an additional 0.4 gram of dimethylbenzylamine was added. The reaction mixture was held at 133° C. for 3 hours, at which time the weight per epoxide was determined to be 950 grams polymer per equivalent epoxide. The reaction temperature was reduced to 10° C., and 18.9 grams of propoxylated p-cresol plasticizer (Synfac 8100, available from Milliken Chemical, Spartanburg, S.C.), 15.4 grams of propylene glycol monophenyl ether, and 8.7 grams of butylglycol were added. At 96° C., 36.7 grams of the diketimine of diethylenetriamine (70% solution in methyl isobutyl ketone) were added. The reaction mixture was cooled to 75° C. over one hour, and then 92 grams of the latent amine compound of Synthesis 1 were added. After 15 minutes of stirring, 65.3 grams of isobutanol, 72.5 grams of butylglycol, 1.5 grams of Surfynol 104 BC (available from Air Products Co., Allentown, Pa.), and 2.0 grams of an anti-cratering agent were added. The temperature was held at 75° C. for 2 hours. The resulting resin solution was 72% solids.

A suitable container was charged with 500.0 grams of the resin solution (60° C.). The resin was mixed for five minutes with 17.5 grams of lactic acid. Then, 145 grams of the carbonate crosslinker of Synthesis 2 were added and mixing was continued for fifteen minutes. The mixture was emulsified by the gradual addition of 2242 grams of deionized water and 21.8 grams of 86% lactic acid with good stirring. The resulting emulsion was 17% solids and had a particle size of 134 nm.

Synthesis 4: Preparation of Electrocoat Emulsion

A 1-liter glass flask was charged with a mixture of 64.3 grams of the diglycidyl ether of bisphenol A, 19.5 grams of bisphenol A, and 5.0 grams of xylene. The mixture was heated to 125° C., and then 0.1 gram of triphenylphosphine was added. An exothermic reaction raised the temperature of the reaction mixture to 164° C. The mixture was then cooled and held at 150° C. for one hour, at which time the weight per epoxide was determined to be 490 grams polymer per equivalent epoxide. The reaction temperature was reduced to 145° C., and 58.5 grams of butylglycol were added. At 85° C., 21.7 grams of the diketimine of diethylenetriamine (70% solution in methyl isobutyl ketone) were added. The reaction mixture held at the temperature for about one hour, and then 37.7 grams of the latent amine compound of Synthesis 1 were added. The temperature was held at 85–90° C. for about four hours. The resulting resin solution was 60% solids.

A suitable container was charged with 170.0 grams of the resin solution along with 33.4 grams of the carbonate crosslinker of Synthesis 2. Then 3.6 grams of acetic acid were added and the mixture was emulsified by the gradual addition of 356.7 grams of deionized water with good stirring. The resulting emulsion was 18% solids and had a particle size of 154 nm.

An electrocoat bath is prepared by added a pigment paste (60% nonvolatiles by weight, pigment-to-binder ratio of 3.5, with $TiO_2$, carbon black, and a clay extender) to the emulsion, and then reducing the pigmented emulsion to the final desired nonvolatiles by adding deionized water. The coating is electrodeposited onto the metallic substrate (cathode) at about 100 volts to a thickness of about 0.5 mils. The deposited film is baked at 350° F. for about twenty minutes to crosslink the film to an intractable, insoluble coating film.

The invention has been described in detail with reference to preferred embodiments thereof. It should be understood, however, that variations and modifications can be made within the spirit and scope of the invention and of the following claims.

What is claimed is:

1. A coating composition comprising, in an aqueous medium,
   (a) a cationic resin having latent amine functionality, comprising the reaction product of:
      (i) a resin having a functional group reactive with a secondary amine and
      (ii) a latent amine reaction product of
         (A) a cyclic anhydride and
         (B) a amine compound comprising two primary amine groups and one secondary amine group;
   and
   (b) a compound comprising a plurality of cyclic carbonate groups.

2. A coating composition according to claim 1, wherein the resin (a)(i) is a polyepoxide resin.

3. A coating composition according to claim 2, wherein the polyepoxide resin is an epoxy resin.

4. A coating composition according to claim 2, wherein the polyepoxide resin is a bisphenol A-based epoxy resin.

5. A coating composition according to claim 1, wherein the resin (a)(i) is a polyepoxide formed by reacting an excess of a polyglycidyl ether of a polyphenol with an extender compound having at least two epoxide-reactive groups.

6. A coating composition according to claim 5, wherein the extender compound is selected from the group consisting of alkoxypolyamines, polyphenols, and mixtures thereof.

7. A coating composition according to claim 1, wherein the latent amine reaction product has a polydispersity of about 3 or less.

8. A coating composition according to claim 1, wherein the latent amine reaction product has a polydispersity of about 1.1 or less.

9. A coating composition according to claim 1, wherein the latent amine reaction product has a polydispersity of about 1.05 or less.

10. A coating composition according to claim 1, wherein the latent amine reaction product is formed by reacting a molar excess of the amine compound (ii)(B) with the cyclic anhydride.

11. A coating composition according to claim 10, wherein there is a ratio of at least about four moles of amine compound (ii)(B) for each mole of cyclic anhydride.

12. A coating composition according to claim 1, wherein the cyclic anhydride is selected from the group consisting of phthalic anhydride compounds, hydrogenated phthalic anhydride compounds, succinic anhydride compounds, and maleic anhydride compounds.

13. A coating composition according to claim 1, wherein the amine compound (ii)(B) is a polyalkylene polyamine.

14. A coating composition according to claim 1, wherein the latent amine reaction product (ii) is the reaction product of a ratio of at least about four moles of diethylenetriamine per mole of phthalic anhydride.

15. A coating composition according to claim 1, wherein the cationic resin (a) comprises at least partially salted primary amine groups.

16. A coating composition according to claim 15, wherein said cationic resin (a) is the reaction product of a resin (a)(i) having a plurality of functional groups reactive with a secondary amine with the latent amine reaction product (a)(ii) and
   (a)(iii) a compound comprising a secondary amine group and at least one ketimine group.

17. A coating composition according to claim 1, wherein the compound (b) has at least about three cyclic carbonate groups per molecule, on average.

18. A coating composition comprising, in an aqueous medium, (a) a cationic resin comprising a structure

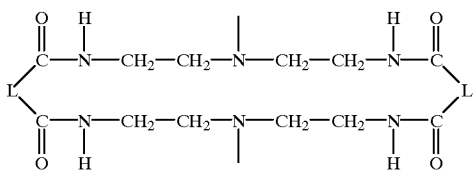

wherein at least one of the amine nitrogens is covalently bonded to the principal resin, and further wherein L is a bivalent linking group in which the bonding valences are on two adjacent carbon atoms; and (b) a compound comprising a plurality of cyclic carbonate groups.

19. A method of coating a conductive substrate, comprising the steps of:
   (a) providing an aqueous coating composition comprising a cationic resin having latent primary amine functionality and a curing agent having a plurality of cyclic carbonate groups, wherein said latent primary amine functionality is obtained by reacting
      (i) a cyclic anhydride and
      (ii) a amine compound comprising two primary amine groups and one secondary amine group;
   (b) immersing a conductive substrate in said electrodeposition coating composition; and
   (c) applying a potential of electric current between an anode and the conductive substrate to deposit a coating layer onto the conductive substrate.

20. A method according to claim 19, wherein said cationic resin is an epoxy resin.

21. A method according to claim 19, wherein the reaction product of (a)(i) and (a)(ii) has a polydispersity of about 1.1 or less.

22. A method according to claim 19, wherein the latent primary amine functionality is obtained by reacting (a)(i) with a molar excess of (a)(ii).

23. A method according to claim 19, wherein the cationic resin further comprises primary amine functionality.

24. A cationic resin formed by the process comprising the steps of:
   (a) reacting a cyclic anhydride and an amine compound comprising two primary amine groups and one secondary amine group to form a latent amine compound;
   (b) reacting the latent amine compound with a resin having at least one group reactive with secondary amine functionality; and
   (c) salting the resin with an acid.

25. A coating composition comprising, in an aqueous medium,
   (a) a cationic resin having latent amine functionality, comprising the reaction product of:
      (i) a resin having a functional group reactive with a secondary amine and
      (ii) a latent amine reaction product of
         (A) a cyclic anhydride and
         (B) a amine compound comprising two primary amine groups and one secondary amine group,
      wherein (i) and (ii) are reacted at a temperature below the temperature at which the latent amine product (ii) would decompose to regenerate primary amine functionality;
   and
   (b) a compound comprising a plurality of cyclic carbonate groups.

26. A cationic resin formed by the process comprising the steps of:
   (a) reacting a cyclic anhydride and an amine compound comprising two primary amine groups and one secondary amine group to form a latent amine compound;
   (b) reacting the latent amine compound with a resin having at least one group reactive with secondary amine functionality at a temperature below the temperature at which the latent amine product (ii) would decompose to regenerate primary amine functionality; and
   (c) salting the resin with an acid.

* * * * *